United States Patent [19]

Orlando

[11] 4,432,190
[45] Feb. 21, 1984

[54] CONTINUOUS HARVESTER FOR PLANTS GROWN IN ROWS

[75] Inventor: Franklin P. Orlando, Morgan Hill, Calif.

[73] Assignee: FMC Corporation, Chicago, Ill.

[21] Appl. No.: 359,558

[22] Filed: Mar. 18, 1982

Related U.S. Application Data

[62] Division of Ser. No. 178,327, Aug. 15, 1980.

[51] Int. Cl.³ ............................................. A01D 46/26
[52] U.S. Cl. ........................................... 56/1; 56/330; 56/328 TS
[58] Field of Search ...................... 56/330, 328 TS, 1

[56] References Cited

U.S. PATENT DOCUMENTS

| | | | |
|---|---|---|---|
| 3,184,908 | 5/1965 | Rust | 56/330 |
| 3,187,493 | 6/1965 | Harrett | 56/330 |
| 3,229,453 | 6/1966 | Harrett | 56/330 |
| 3,396,521 | 8/1968 | McKibren et al. | 56/330 |
| 3,485,027 | 12/1969 | Ganger | 56/330 |
| 3,911,653 | 10/1975 | Burton | 56/330 |
| 4,085,572 | 4/1978 | Bruel | 56/330 |
| 4,114,463 | 9/1978 | Garden et al. | 56/330 |
| 4,172,352 | 10/1979 | McCarthy et al. | 56/328 |
| 4,173,859 | 11/1979 | Goldsmith et al. | 56/330 |
| 4,198,801 | 4/1980 | Claxton | 56/1 |
| 4,207,727 | 6/1980 | Poytress | 56/330 |
| 4,250,700 | 2/1981 | Horn et al. | 56/330 |
| 4,265,080 | 5/1981 | Goldsmith | 56/330 |
| 4,286,426 | 9/1981 | Orlando et al. | 56/330 |
| 4,299,081 | 11/1981 | Harris et al. | 56/330 |

*Primary Examiner*—Gene Mancene
*Assistant Examiner*—Kris R. Schulze
*Attorney, Agent, or Firm*—A. J. Moore; H. M. Stanley; R. B. Megley

[57] ABSTRACT

In a method of and apparatus for harvesting a row of grapevines, a pair of opposed parallel striker bars are pivoted back and forth transversely of the row of grapevines about an axis that is situated over the plants and that extends parallel to the direction of travel of the harvester. The front ends of the striker bars are supported by a front shaker frame, and the rear ends of the striker bars are supported by a rear shaker frame that is free to pivot independently of the front shaker frame. Dual-eccentric-weight oscillatory drives are mounted to the front and rear shaker frames. Various drive arrangements are disclosed for rotating the eccentric weights on the front and rear shaker frames at different frequencies, amplitudes or phase relationships, as desired. Due to the different motions of the front and rear ends of the opposed striker bars, the bars impart a varying shaking action on the grapevines as the bars are translated forwardly relative to the grapevines.

4 Claims, 9 Drawing Figures

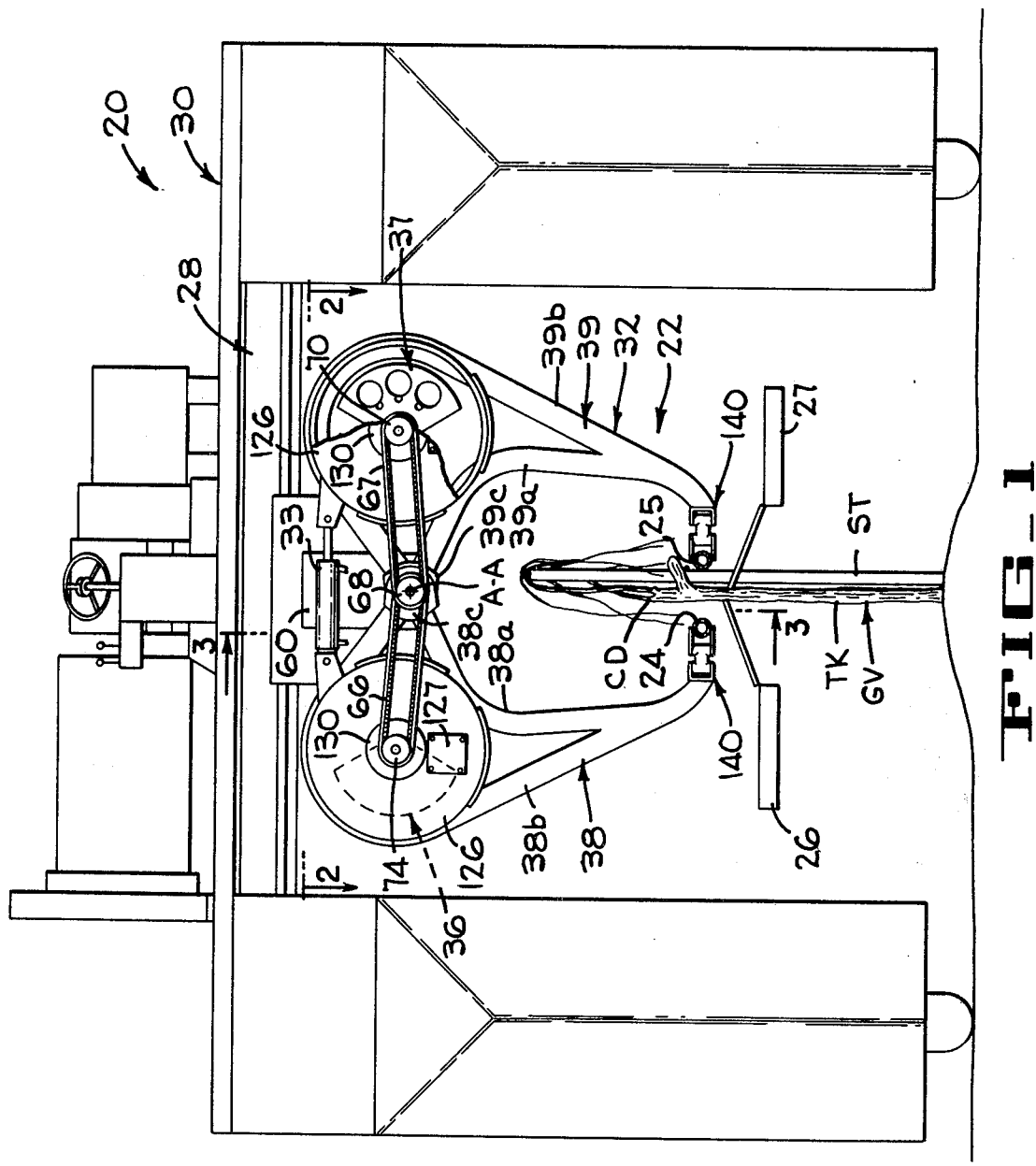

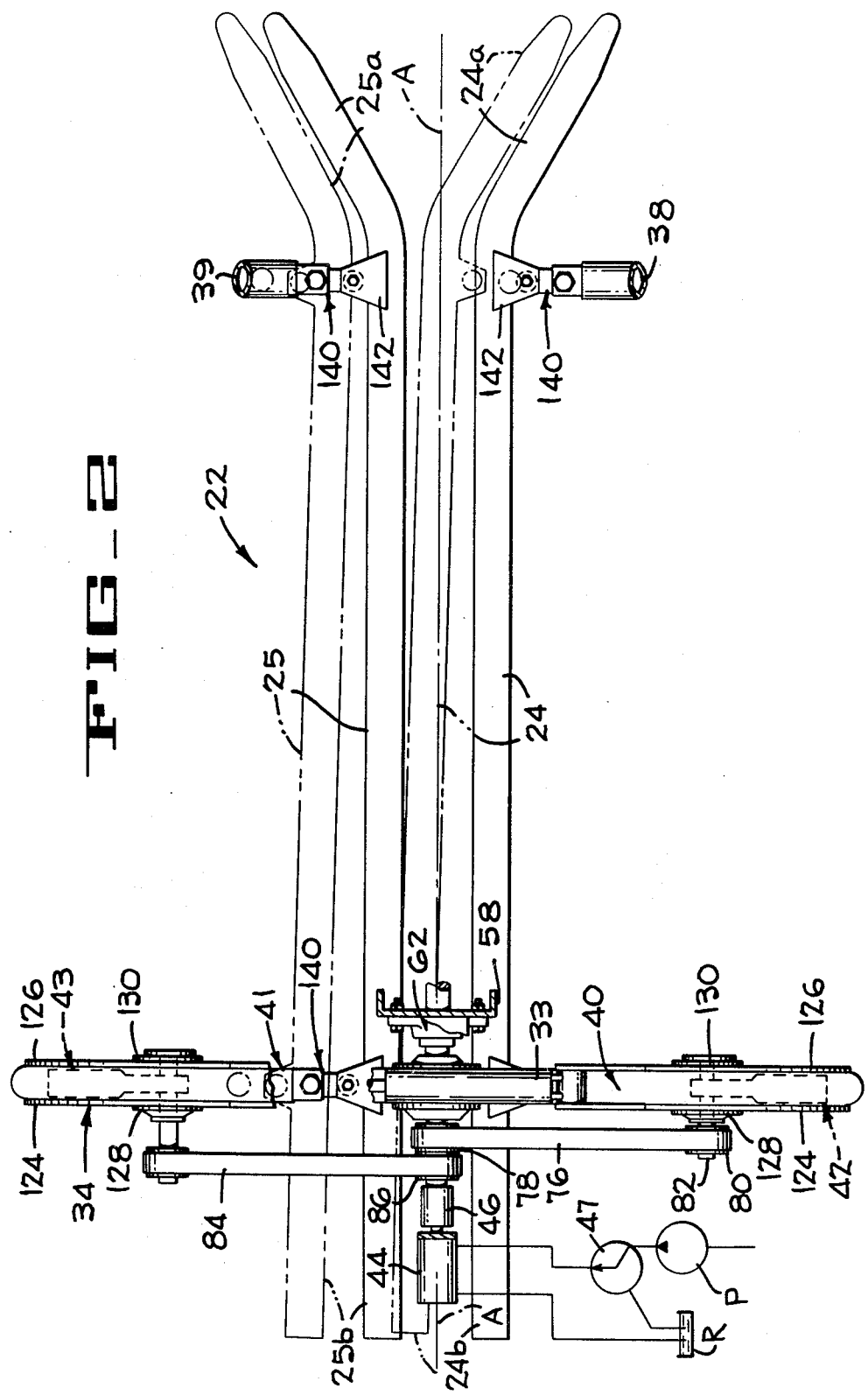

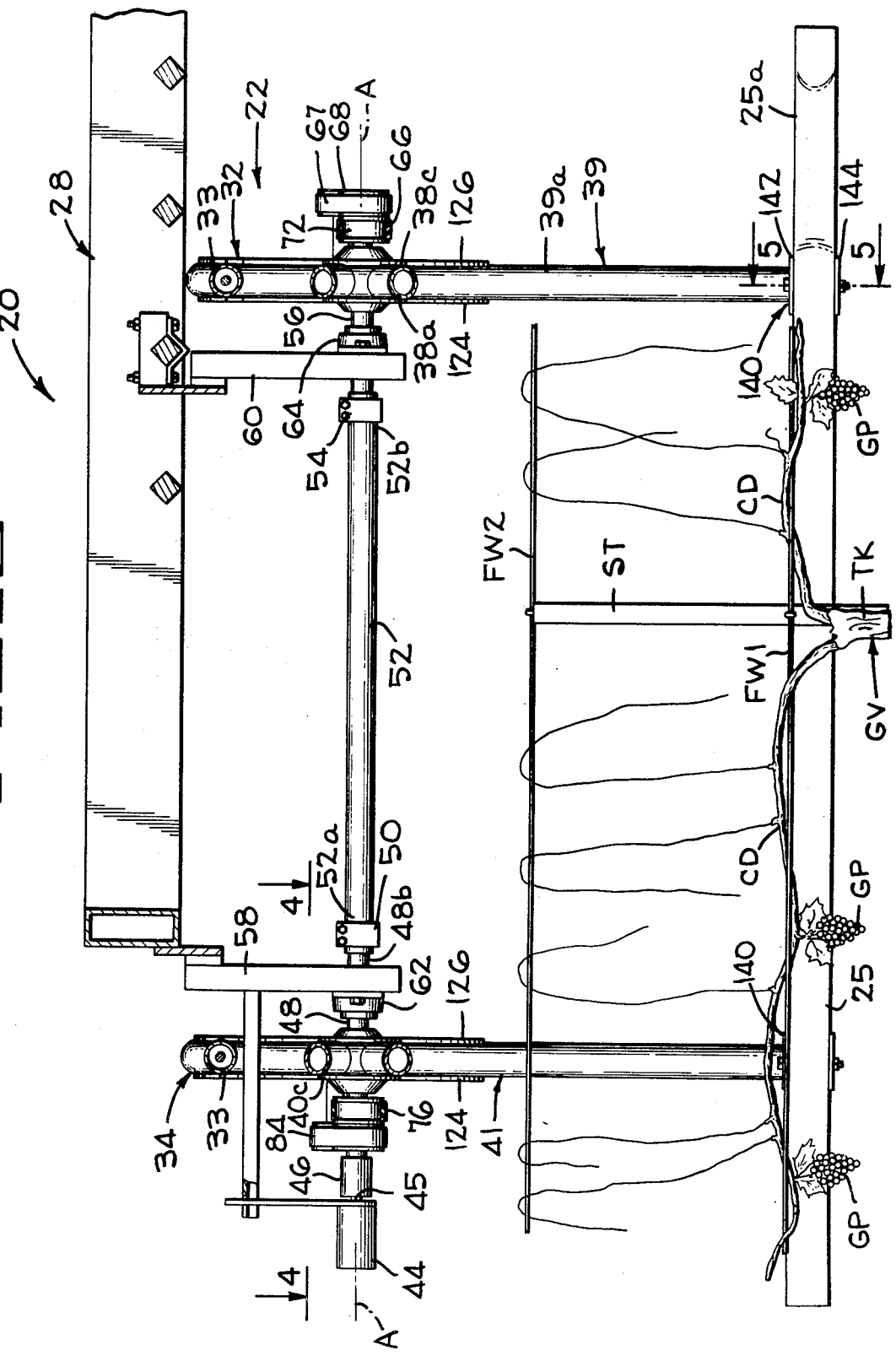

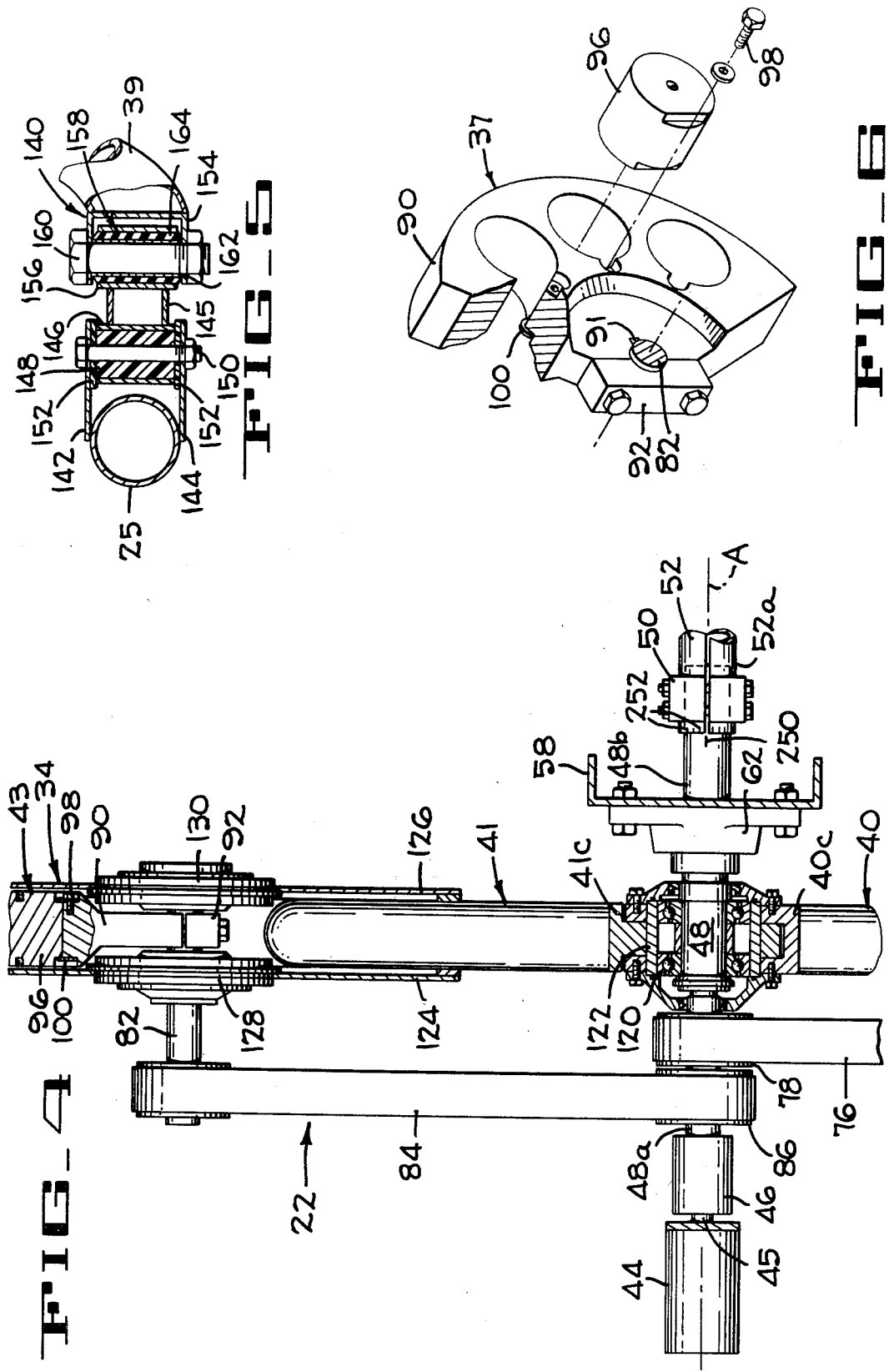

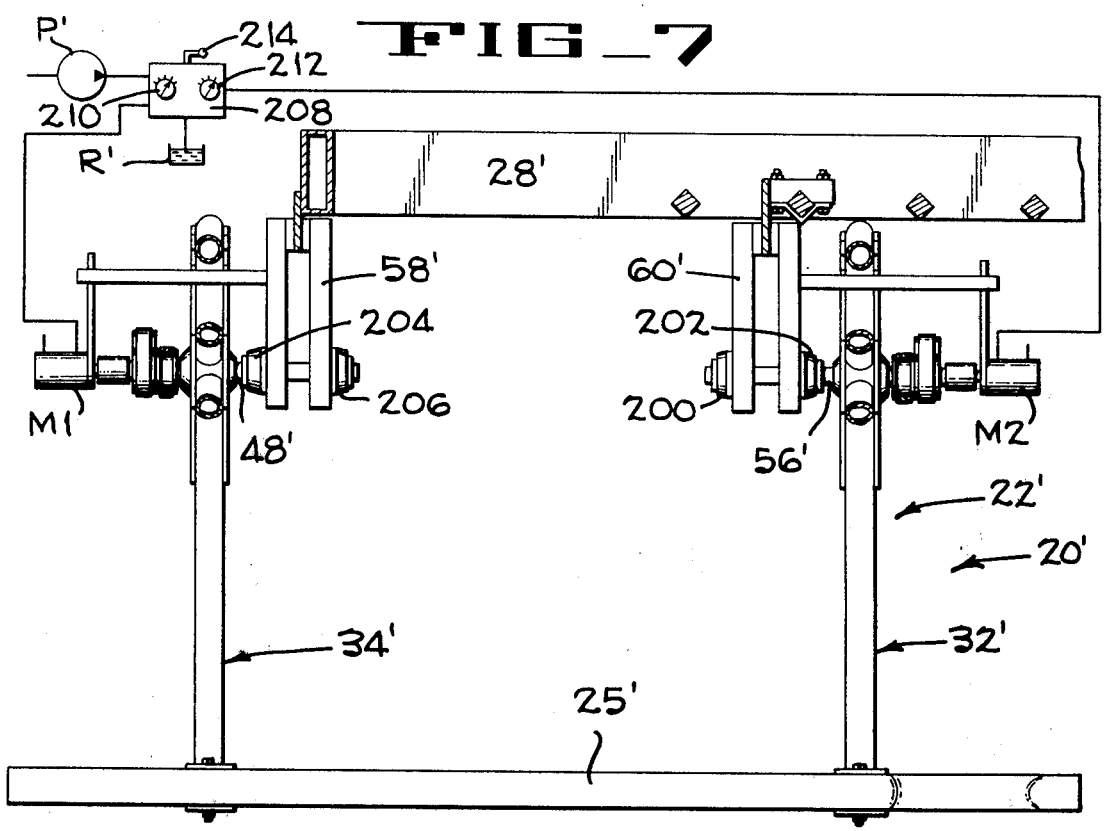
FIG_7
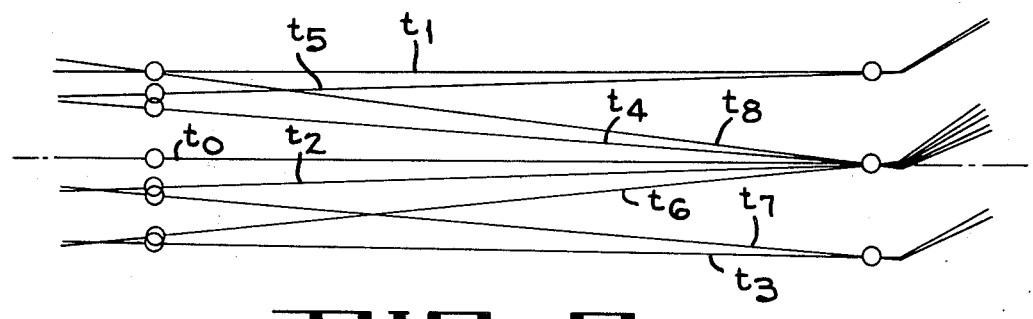
FIG_8
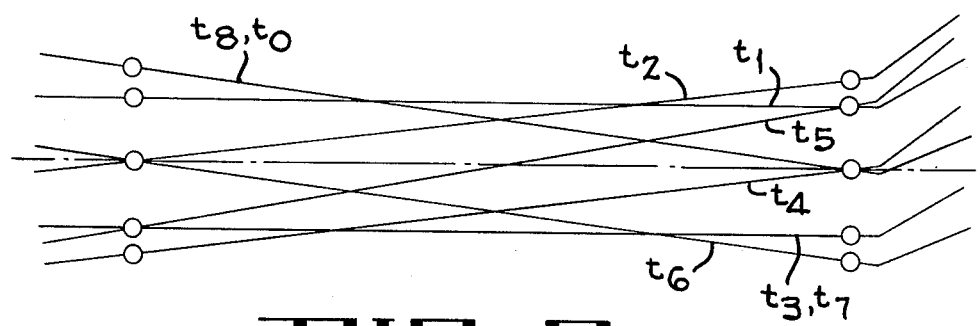
FIG_9

CONTINUOUS HARVESTER FOR PLANTS GROWN IN ROWS

This application is a division of application Ser. No. 178,327, filed Aug. 15, 1980.

BACKGROUND OF THE INVENTION

1. Field of the Invention

The present invention relates to methods of and apparatus for continuously harvesting crops that are grown in rows such as grapevines and the like.

2. Description of the Prior Art

The copending United States patent application of F. P. Orlando and R. W. FitzMaurice, Ser. No. 95,822 filed Nov. 19, 1979, describes and claims a vibratory fruit harvester for plants that are grown in rows such as grapevines. The harvester disclosed therein includes a vehicle having a frame adapted to straddle a row of grapevines and a shaker assembly that is pivotally mounted to the support vehicle for rotation about an axis that is parallel to and spaced above the row of crops to be harvested. The shaker assembly includes trunk striker bars that are attached to an elongated rigid frame at a height to engage the trunks and/or cordons of the plants. The striker bars are pivoted back and forth to alternately engage opposite sides of the trunks or cordons of the grapevines so that the harvester continuously harvests grapes from the grapevines as the harvester is driven down the row thereof. It is noted that the use of parallel striker bars to alternately engage opposite sides of the plants to be harvested is also shown in U.S. Pat. Nos. 3,187,493 and 3,229,453 to Harrett.

Another type of vibratory harvester for grapevines and bushes includes fingers or rods adapted to penetrate or strike the foliage of vines or bushes to dislodge the berries or fruits therefrom. Example of this general type of harvester is shown in U.S. Pat. No. 3,184,908 to Rust, U.S. Pat. No. 3,396,521 to McKibben et al., and U.S. Pat. No. 3,485,027 to Ganger.

U.S. Pat. No. 4,198,801 to Claxton discloses a method of harvesting grapevines wherein shaker elements of a harvester are positioned within the canopy of the grapevines at a level above the upper ends of the trunks thereof and on opposite sides of the fruit-bearing portion of the vines. This patent describes fruit support structures of trellis systems that have been widely used in the wine industry. According to the method and apparatus shown in this patent, elongate shaker bars are reciprocated transversely as the harvester is moved down a row so that the vines and fruit support structure associated with the row are subjected to a uniform or steady state shaking action.

SUMMARY OF THE INVENTION

The present invention provides a method of and apparatus for continuously harvesting plants grown in rows such as grapevines wherein a particular plant (or portion thereof) in the row is subjected to a varying shaking action. According to the method and apparatus of the present invention, the plants in a row are alternately struck on opposite sides by an opposed pair of striker members. The striker members are pivoted about an axis that is overhead and parallel to the row of plants to be harvested. The striker members are, concurrently with such pivoting, translated forwardly down the row of plants. The rear ends of the opposed striker members are pivoted about the aforesaid axis at a different frequency, phase relationship and/or amplitude or displacement than that of the pivoting of the front ends of the striker members. Such variance in pivoting causes a correlative variance in shaking action exerted on a plant by the striker members as the striker members are moved forwardly. This, in turn, changes the acceleration of the individual fruits or berries attached to the plants to thereby facilitate effective removal of such fruits or berries. On the other hand, the varying pivotal shaking action induced by the striker members will result in minimal damage to the plants or any fruit support structure for the plants.

In a preferred embodiment of the apparatus of the present invention, a pair of opposed elongate striker bars are supported in a substantially parallel relationship and at a selected transverse spacing. The front ends of the striker bars are supported by a front shaker frame, and the rear ends of the striker bars are supported by a rear shaker frame. Both shaker frames are pivotally mounted to the support frame of the harvester vehicle for free articulation relative to each other; that is, the frames are mechanically free of each other. Separate eccentric weight drive mechanisms are provided for pivoting the front and rear shaker frames. In the preferred embodiment, the trailing ends of the elongate striker bars are swung back and forth in phase with the front ends thereof out but through a wider arcuate path so that a plant is shaken more vigorously as the harvester is translated forwardly relative to the plant.

BRIEF DESCRIPTION OF THE DRAWINGS

FIG. 1 is a diagrammatic front end elevation of a first embodiment of the harvester of the present invention with parts of the shaker assembly of the harvester being broken away to show one of the eccentric weight assemblies incorporated in the front shaker frame of the shaker assembly.

FIG. 2 is an enlarged section taken generally on line 2—2 of FIG. 1 illustrating in phantom lines the motion of the striker bars of the shaker assembly and diagrammatically showing the fluid power drive for the shaker assembly.

FIG. 3 is an enlarged section taken generally on line 3—3 of FIG. 1.

FIG. 4 is an enlarged section taken generally on line 4—4 of FIG. 2.

FIG. 5 is an enlarged section taken on line 5—5 of FIG. 3.

FIG. 6 is a fragmentary perspective view illustrating one of the eccentric weight assemblies of the rear shaker frame of the shaker assembly.

FIG. 7 is a diagrammatic sectional view taken longitudinally through a second embodiment of the harvester.

FIG. 8 is a graphical representation of the motion of one of the striker bars of the shaker assembly of the second embodiment wherein the rear ends of the striker bars are oscillated at a greater frequency than are the front ends of the striker bars.

FIG. 9 is a graphical representation of the motion of one of the striker bars of the shaker assembly of the first embodiment of the harvester wherein the weights on the front and rear ends of the striker bars have been equalized and wherein the front and rear ends of the striker bars are oscillated in an out-of-phase relationship.

DESCRIPTION OF THE PREFERRED EMBODIMENTS

In a first embodiment of the harvester 20 of the present invention as illustrated in FIGS. 1-6, the harvester includes a shaker assembly 22 that is adapted to continuously harvest grapes from grapevines GV as the harvester is driven down a row of the grapevines. The shaker assembly 22 includes a pair of opposed, horizontal and transversely spaced striker bars 24 and 25 the striker bars are positioned at opposite sides of the grapevines at a height that is generally aligned with the cordons CD of the grapevines (FIGS. 1 and 3). As illustrated in FIG. 3, the grapevines are supported on a fruit support structure consisting of longitudinally spaced, vertical stakes ST and horizontal fruiting wires FW1 and FW2 connected between the stakes. The lower wire FW1 supports the cordons of the grapevines from which the bunches of grapes GP depend, and the upper wire FW2 supports non-fruit bearing canes that form a canopy (the leaves not being shown). The shaker assembly 22 is adapted to oscillate the striker bars about an horizontal axis A—A that is spaced above the tops of the stakes ST and grapevines. As the harvester is driven down the row of grapevines, the oscillating striker bars alternately impact opposite sides of the trunks TK and cordons CD of the grapevines to dislodge the grapes therefrom.

The grapes GP dislodged from the grapevines GV are collected on parallel conveyors 26 and 27 (shown diagrammatically in FIG. 1). The conveyors are mounted (by means not shown in the drawings) to pivot relative to the support frame 28 of the harvester vehicle 30 so that the conveyors may shift from side to side in the event that the driver of the harvester vehicle does not keep the harvester centered over the row of grapevines.

It will be seen that the harvester 20 includes a vehicle 30 having a conventional inverted U-shape in end elevation that is adapted to straddle the row of grapevines GV to be harvested. The shaker assembly 22 and the fruit collection conveyors 26 and 27 are also adapted to straddle the row and are both suspended from the support frame 28 of the vehicle 30. The vehicle includes conventional leveling means for maintaining the shaker assembly in a horizontal orientation.

The shaker assembly 22 includes a front shaker frame 32 and a rear shaker frame 34 that are suspended from the support frame 28 of the vehicle 30 to pivot about a common axis A—A. It should be noted, however, that the front and rear shaker frames 32 and 34 may be pivoted about separate generally parallel axes, rather than a single or common axis as shown. If pivoted about separate axes, the separate axes for shaker frames would extend generally parallel to the direction of travel of the harvester vehicle 30 and both would extend at a height generally above the grapevines. The shaker assembly 22 is, as shown in FIG. 2, adapted to cause the front, or leading, ends 24a and 25a of the striker bars 24 and 25, respectively, to oscillate about the common axis of rotation A—A through a smaller arc than the arc through which the rear or trailing ends 24b and 25b of the bars 24 and 25 are oscillated. In this manner, any particular portion of a cordon CD or any particular trunk of the grapevines in a row will be subjected to greater shaking forces as the bars progress forwardly relative to the portion of the cordon or the trunk.

The front and rear shaker frames 32 and 34 are not rigidly connected but are mounted for free articulated movement relative to each other. That is to say, the shaker frames 32 and 34 are independently pivotally connected to the vehicle frame 28 so that any reaction forces transmitted to the front shaker frame 32 will be isolated from the rear shaker frame 34. Under normal operating circumstances, the lack of rigid mechanical connection between the front and rear shaker frames is advantageous because should the shaker frames be connected, the connecting members would be subjected to some torsional and bending forces. Such forces could be caused, for example, when a particularly stiff trunk of a mature vine is engaged either at the front or at the rear ends of the striker bars. Moreover, an operator may occasionally fail to spread open the striker bars 24 and 25 at the end of a row of grapevines to accommodate the relatively larger stakes or posts at the ends of the row. In such event, the reaction forces induced by hitting the end post are isolated generally within the front shaker section; such reaction forces are not transmitted through any connecting member to the rear shaker frame 34, except through the striker bars.

To enable the front shaker frame 32 and the rear shaker frame 34 to impart different shaking action on the front and rear ends of the striker bars 24 and 25, the striker bars are flexibly connected to the front and rear shaker frames, and the shaker frames 32 and 34 are driven concurrently and either at different frequencies, out-of-phase with each other, at different amplitudes of arcuate movement, or in combinations of such modes. As previously stated, the embodiment of the shaker assembly 22 in FIGS. 1-6 assembled to cause the rear ends 24b and 25b of the striker bars 24 and 25 to be swung back and forth through a greater peak-to-peak amplitude than the amplitude of swinging of the front ends 24a and 24b of the striker bars. The front and rear shaker frames each include a dual-eccentric-weight oscillatory drive mechanism that is isolated from the support frame 28 of the harvester vehicle 30. The oscillatory drive for the front shaker frame 32 includes a pair of eccentric weight assemblies 36 and 37 (FIG. 1), and the rear shaker frame includes a pair of eccentric weights 42 and 43 (FIG. 2). The eccentric weight assemblies 42 and 43 are of equal weight but are each heavier than the weight assemblies 36 and 37 (weight two are also of equal weight). Since the peak-to-peak amplitude of arcuate movement of either shaker frame depends on the mass of its weight assemblies and the radius from the axis of rotation to the center of mass thereof, the rear shaker frame will be pivoted through a greater arc than the front shaker frame.

The eccentric weight assemblies 36 and 37 are rotatably mounted to the front shaker frame 32 for rotation about parallel axes that are equidistantly spaced from the rotational axis A—A. Such eccentric weights are also symmetrically disposed relative to a vertical plane through the shaker assembly when the shaker assembly is in the vertical rest position shown in FIG. 1. The equidistant spacing of the two eccentric weight assemblies is such that when they are rotated in the same direction and at 180° out-of-phase relative to each other (FIG. 1), a rocking couple type of shaking force is alternately applied by the shaker arms 38 and 39 to the striker bars 24 and 24. As the eccentric weights are rotated, first the shaker frame pivots in one direction to cause one of the striker bars 24, 25 to strike the trunk TK and/or the cordons of a vine in one direction and thereafter push the engaged trunk with a steadily increasing force until a maximum force is reached. Thereafter, the force exerted on such striker bar diminishes, and the shaker frame pivots in the opposite direction. Then, the other striker bar is pivoted with steadily increasing force against the opposite side of the trunk or cordon.

The eccentric weight assemblies 42 and 43 are rotatably mounted to the rear shaker frame 34 in a symmetrical, balanced manner that is identical to that of the mounting of the weight assemblies 36 and 37 to the front shaker frame 32.

The front and rear shaker frames 32 and 34 are both balanced about their axis of rotation. Both frames have an identical welded tubular construction that provides high strength relative to its moment of inertia. The tubular construction is designed with the weight distribution of the striker bars 24 and 25, the eccentric weight assemblies and its other parts in mind so that the center of gravity of each shaker frame is approximately coincident with the axis of rotation A—A. Due to such coincidence, the large forces exerted by the rotating eccentric weights on the respective shaker frames will so offset each other that minimal vibrational forces will be transmitted from the shaker assembly 22 through the suspension brackets 58 and 60 to the support frame 28. A further major advantage resulting from the approximate coincidence of the center of gravity with the axis of rotation A—A is that the entire shaker assembly 22 is free to pivot in either direction in the event that the lower operator does not properly center the vehicle 30 relative to the row of grapevines being harvested. Yet, no significant increase in force will be exerted on the vines and trellis system (e.g., the stakes ST and wire FW1) by the striker bars while operating in an off-vertical orientation.

In particular, the center of gravity of the shaker assembly 22 is slightly lower than its axis of rotation A—A to cause the shaker assembly to remain upright while stationary.

The construction of the tubular frames 32 and 34 and the mounting of the weight assemblies 36, 37, 42 and 43 to the respective shaker frames 32 and 34 will now be described in connection with FIGS. 1–4. It will be seen in FIG. 1 that the front shaker frame includes arms 38 and 39 that are symmetrical with respect to each other. The arms 38 and 39 respectively include inner tubular members 38a and 39a and outer tubular members 38b and 39b. The inner tubular members 38a are generally C-shaped to provide an open space therebetween for the plants. Tubular members 38a and 39a project downwardly from hub portions 38c and 39c and terminate at lower ends to which the striker bars are connected. The outer tubular members 38b and 39b have inner ends connected to the respective hubs 38c and 39c and outer (or lower) ends welded to the inner tubular portions near the lower ends thereof. The hubs of the arms of the shaker frames are journaled in an intermeshing relationship so that the tubular arms may be scissored relative to each other. The articulatable connection of the hubs is shown in FIG. 4 with respect to the hubs of 40c and 41c of the arms 40 and 41 of the rear shaker frame 34. It will be seen in FIG. 4 that a bearing 120 and a sleeve 122 are mounted upon the respective pivot shaft sections 48 and 56. The tubular construction of the rear shaker frame 34 is substantially identical to the front shaker frame 32.

As shown in FIG. 4 with respect to the rotatable mounting of the weight assembly 43 to the rear shaker frame 34, relatively large flat annular plates 124 and 126 are mounted at opposite sides of each of the arms 38-41 of the shaker frames. The shafts for the weight assemblies are rotatably supported in bearings 128 and 130 that are in turn fastened to the plates 124 and 126, and the weight assemblies are keyed to the shafts. As shown in FIG. 1, a small square cover plate 127 is removably fastened to the outside plate 126 of each arm so that removable weight plugs 96 may be removed from or added to the weight assemblies in the manner hereinafter described.

The striker bar 24 is connected by flexible couplings 140 (FIGS. 2 and 5) to the arms 38 and 40 of the front and rear shaker frames 32 and 34, respectively. The opposing striker bar 25 is connected by identical flexible couplings 140 to the arms 39 and 41 of the front and rear shaker frames. The flexible couplings permit the strikers to skew in a transverse direction as the bars are swung back and forth in the shaker frames. The striker bars are tubular and have triangular bracket plates 142 and 144 that are mounted above and below the bars at the points of connection to the arms (FIGS. 2 and 5). Each coupling 140 includes a link 145 having a sleeve 146 at the end thereof to which the striker bar is connected. A plastic filler tube 148 is mounted within the sleeve 146 and a bolt 150 is used to freely pivotally connect the link 144 between the plates 142 and 144. Plastic washers 152 provide low friction wear surfaces between the link and striker bar bracket plates. The other ends of the links 144 are flexibly and resiliently connected to the lower inwardly projecting end of the arms of the shaker frames. It will be seen that a bracket 154 is connected to the lower end of each arm. A sleeve 156 is provided at the outer end of each link 145, and the sleeve 156 is received in the bracket 154 in a spaced apart relationship therefrom so that the link may move without contacting the bracket. A torsioelastic or torsion spring 158 is tightly secured between the bracket 154 and the sleeve 156 by a bolt 160. The spring 158 permits the link to rotate about the pin 160 against spring resistance. Spring 158 consists of a metal sleeve 162 and a rubber bushing 164 adhered to the outside of the bushing. The bushing is forced into the sleeve 156 of the link. As shown in FIG. 2, where the rear ends of the striker bars 24 and 25 are displaced more from the centerline of the row (which is coincident with the axis A—A) than the front ends thereof, the bars will of course be skewed from the centerline. The flexible couplings 140 permit such skewing into the positions shown in phantom outline in FIG. 2, but the couplings bias the bars toward the relaxed positions shown in solid outline in FIG. 2.

In the first embodiment of the harvester 20, the dual-eccentric-weight oscillatory drive mechanisms associated with a front rear shaker frame 32 and 34 are powered by a single hydraulic motor 44. The motor 44 is rigidly mounted to the suspension bracket 58 for the rear end of the shaker assembly so that the shaft 45 of the motor is aligned with the axis A—A (FIGS. 2-4). As shown diagrammatically in FIG. 2, the speed of the motor 44 is controlled by a regulator or flow divider 47 which splits the flow from a hydraulic pump P between the motor and a reservoir R according to the position of the regulator. The regulator 47 is positioned near the operator of the harvester 20 so that the speed of the oscillation of the shaker frames can be conveniently changed during harvesting.

The motor shaft 45 is rigidly but releasably fastened by a coupling 46 to the rear end 48a of the rear shaft section 48 (FIG. 3). The front end 48b (FIG. 4) is rigidly fastened by a coupling 50 to the rear end 52a of in heavy-duty hollow shaft 52. Shaft 52, hereinafter referred to as the connecting shaft, has an adjustable coupling 54 attached to the front end 52b thereof for adjustably and rigidly attaching such end to the rear end of a front shaft section 56. The front shaker frame 32 is freely rotatably received on the front shaft section 56, and the rear shaker frame 34 is also freely rotatably received on the shaft section 48. The interconnected shaft sections 48, 52 and 56 is, in effect, a single shaft, and such shaft assembly is supported at the desired axis of rotation A—A by suspension brackets 58 and 60 that depend downwardly from the vehicle frame 28. In particular, the rear shaft section 48 is freely rotatably received in a bearing 62 connected to the bracket 58, and the front shaft section 56 is freely rotatably received in a bearing 64 connected to the bracket 60. It will thus be appreciated that the front and rear shaker frames 32 and 34 are each freely rotatably mounted upon the shaft sections 48 and 56, respectively, so that such frame sections may articulate freely relative to each other and thus induce a different shaking action on the front and rear portions of the striker bars 24 and 25. The eccentric weight assemblies 36 and 37 of the front shaker frame 32 are driven by timing belts 66 and 67, respectively (FIGS. 1-4). The timing belt 66, 67 are conventional heavy-duty, toothed timing belts. The belt 67 is entrained on a toothed pulley 68 which is attached to the front end of the shaft section 56, and further on a toothed pulley 70 which is attached to the front end of the shaft to which the weight assembly 37 is affixed. The belt 66 for driving the other eccentric weight assembly 36 of the front shaker frame 32 is entrained between a toothed pulley 72 also mounted on the shaft section 56 inboard of pulley 68 and further on a toothed pulley 74 mounted to the shaft to which the eccentric weight assembly 36 is affixed.

The eccentric weight assemblies 42 and 43 of the oscillatory drive mechanism for the rear shaker frame 34 are driven by a timing belt arrangement that is similar to that just described in connection with the front shaker section 32. A timing belt 76 is entrained between a toothed pulley 78 mounted near the rear end 48a of the shaft section 48 and further upon a tooth pulley 80 that is affixed upon the trailing end of the shaft 82 to which the eccentric weight assembly 42 is connected. The other eccentric weight assembly 43 of the rear shaker frame 34 is driven by a timing belt 84 connected between a pulley 86 that is keyed to the shaft section 48 and a pulley connected to the drive shaft for the eccentric weight assembly 43. It noted that all of the aforementioned pulleys are of the same sprocket size so that the eccentric weight assemblies 36, 37, 42 and 43 all rotate at the same speed.

As shown in FIGS. 1-6, the eccentric weight assemblies 42, 43 of the rear shaker frame 34 are driven in phase with and at the same frequency of the rotation of the weights 36 and 37 of the front shaker frame 32. However, the weight assemblies 42 and 43, as previously mentioned, are heavier than the weights of the front weight assemblies 36 and 37. Referring to FIGS. 4 and 6, the eccentric weight assemblies 42 and 43 each include an eccentric weight 90 which have a keyway 91 and which are attached to the associated shaft 82 by a clamping ring 92. Each weight 90 has three large bores or openings formed equiangularly therein at equal spacings from the center of rotation thereof. A cylindrical plug 96 is received within the center one of the cavities of each rear weight and is affixed with the cavity by a set screw 98. The set screw is adapted to engage a notch formed in one side of the plug. A washer 100 is affixed to the weight 90 at the opposite side thereof from the set screw to retain the opposite side of the plug.

In the preferred embodiment each eccentric weight 90 of the four eccentric weight assemblies 36, 37, 42 and 43 weigh approximately 75 pounds, and each removable plug 96 weighs approximately 11 pounds. In this specific example, weight assemblies 36 and 37 include only the weights 90; whereas the rear weight assemblies 42 and 43 include one plug 96 each. The 75 lb. front weights 36, 37 are adapted to cause the front shaker frame to oscillate back and forth transversely of the row of grapevines through a transverse distance of approximately 4.75 in. The 86 lb. rear weight assemblies 42 and 43 are, in contrast, adapted to oscillate the rear shaker frame 34 through a peak-to-peak path of approximately 5.50 in. It should be noted at this point that the strike bars 24 and 25 will be maintained in a parallel relation to each other and at a fixed distance of (approximately 4–6 inches) by the hydraulic cylinders 33 to accommodate the thickness of the trunk TK of the grapevines GV and the trellis stakes ST of the fruit support structure. As shown with respect to the front frame 32, the cylinder 33 is connected between the upper ends of the arms 38 and 39. An identical hydraulic cylinder is connected between the arms 40 and 41 of the rear frame. The two cylinders 33 are actuated to open both shaker frames at the ends of a row to accommodate the greater width of the end support posts (not shown) of the trellis structure. The cylinders are set at the same position to hold the striker bars in a parallel relationship and at a fixed spacing throughout the pivoting and skewing of the bars.

A second embodiment of the harvester of the present invention is shown in FIG. 7. The numberals for the parts of the second preferred embodiment of the harvester that are similar to equivalent parts of the just-described first embodiment are given prime designations. The second embodiment of the harvester 20' includes a shaker assembly 22' also including a front shaker frame 32' and a rear shaker frame 34', and the shaker frames 32' and 34' are pivotally mounted on shafts 56' and 48' so that the frames may pivot independently of each other. Striker bars 25' (only one shown) are flexibly mounted between the front and rear frames. The pivot shafts 48' and 56' are respectively independently driven by separate hydraulic motors M1 and M2. The front shaft 56' is cantilevered from a pair of longitudinally spaced bearings 200 and 202 mounted to a bracket 60' that is, in turn, connected to a cross member of the support frame 28' of the harvester vehicle. The rear pivot shaft 48' is cantilevered from a pair of bearings 204 and 206 which are connected to a bracket 58' that depends from the rear end of the support frame 28'. The motors M1 and M2 are respectively suspended from extensions of the brackets 58' and 60'.

As shown diagrammatically in FIG. 7, the hydraulic motor M1 for driving the eccentric weights (not shown) of rear shaker frame 34' and the motor M2 for driving the front shaker frame 32' are regulated by a dual flow regulator or three-way flow divider 208. The dual flow regulator 208 includes a pair of hand knobs 210 and 212 for independently regulating the rate of flow of hydraulic fluid to the motors M1 and M2. The regulator 208 is connected to a pump P' and includes a relief port connected to a reservoir r'. It is noted that the outlet lines of the motors M1 and M2 are also connected to the reservoir R', although this is not shown in FIG. 7. The regulator 208 includes an on-off handle 214. A suitable dual flow regulator is the Model 2FFL12-D regulator manufactured by Fluid Controls, Inc., of Mentor, Ohio. The hand knobs 210 and 212 can be set at various detent positions to cause the motors to operate at the same speed, different speeds and even to totally interrupt flow to one of the motors while operating the other motor.

Again, the dual flow regulator 208 is preferably positioned near the operator of the harvester 20' so that the relative speed or frequency of pivoting of the front and rear shaker frames 32' and 34' may be adjusted during harvesting. It is preferred that the speed of the motor M1 for the rear shaker frame 34' be operated at a higher frequency so that the rear ends of the striker bars (only bar 25' being shown in FIG. 7) are pivoted more rapidly than the front ends thereof. Such pivoting will cause the rear ends of the striker bars to shake any particular portion of the grapevine more vigorously when the grapevine is engaged between the rear end of the skis.

Thus, in both of the illustrated embodiments of the harvester, the grapevines GV are shaken less vigorously by the front ends of the striker elements or bars so that the grapes GP which are easiest to remove may fall off first. Then as the harvester is translated forwardly relative to such portion of the grapevine, such portion will be shaken more vigorously by the rear ends of the skis so that the grapes which are more difficult to remove are shaken loose. This non-steady state shaking pattern is expected to remove a much higher percentage of the grapes than a steady state operation. wherein the striker elements in contact with the plant are moved at the same rate and into the same amplitude. It is further expected that the non-steady state shaking will enable efficient grape removal with minimum damage to the trunks TK, cordons CD or other parts of the grapevines GV and also to the stakes ST and fruiting wire FW1 of the trellis support structure.

Another mode of operation of the embodiment of the harvester shown in FIGS. 1-6 will now be briefly described. The adjustable coupling 50 permits the connecting shaft 52 to be loosened from the rear shaft section 48. As shown in FIG. 4, the shaft 48 has a mark 250 thereon and the coupling 50 has several angular marks 252 that are superimposed thereon. By loosening the coupling or clamp 50, the phase relationship of the pivoting action of the front and rear shaker frames 32 and 34 can be changed. For example, the front and rear shaker frames ca be pivoted 180° out-of-phase with each other by attaching the shaft 48 180° out-of-phase with the shaft 52 relative to the arrangement shown in FIG. 4. This will cause the striker bars 24 and 25 to skew transversely back and forth relative to the grapevine. In other words, the bars will pivot in a generally horizontal plane in addition to pivoting in a vertical plane. This type of shaking will produce an undulating action in the grapevines. Since the grapevines are tained on the fruiting wire FW1, the fruiting wire will be caused to undulate by the combined skewing and swinging action.

FIG. 9 is a graphical representation of the last mentioned mode of operation wherein the front and rear shaker frames 32 and 34 are pivoted out-of-phase. In FIG. 9 the orientations and positions of the striker bar 24 at various points corresponding to various rotational positions of the eccentric weights of the shaker assembly 22. In FIG. 9, the small circles indicate the pivot points between the bars and arms of the shaker frames 32 and 34. A first position of the striker bar is indicated by the line $t_0$ and later positions of the striker bar are indicated respectively by the lines $t_2$-$t_8$. It is noted that the positions indicated by lines $t_o$-$t_8$ are each taken at 45-degree increments of rotation of the eccentric weight assemblies. It will be seen that the 180° out-of-phase mode of operation causes the ends of the strikers to skew rapidly in a whipping action. FIG. 9 thus depicts the combined effect of the swinging and skewing (horizontal pivoting of the bars) when operated in the out-of-phase mode.

FIG. 8 graphically represents the various positions of a striker bar 24' of the second embodiment of the harvester shown in FIG. 7. FIG. 8 indicates that the horizontal skewing and vertical pivoting action of the striker bars which occurs where the rear motor M1 is operated at a speed which is 10 percent greater than the speed of the front motor. The lines $t_o$ through $t_8$ indicate the various positions of a striker bar at 90° of rotation of the front pair of eccentric weight assemblies. It will be seen that in the dual frequency mode of operation the ends of each of the parallel striker bars whip back and forth relative to each other in this embodiment to produce a relatively complex non-steady state shaking action.

FIG. 2 shows the movement of the striker bars 24 and 25 in the first-described embodiment of the harvester wherein the rear shaker frame 34 is driven through a greater amplitude of oscillation than the front shaker frame 32. The skewing or whipping action produced by dual amplitude mode of ocillation is somewhat exaggerated in FIG. 2. It will be generally seen that when the striker bars achieve the full transversely extended position shown in phantom outline in FIG. 2, the rear ends 24b and 25b of the striker bars are displaced much farther from the centerline of the row of grapevines than the front ends thereof. Therefore, a plant engaged by the front end of the bar 24 will be shaken less vigorously than a plant engaged by the rear end of the bar 24. Thus, the shaking force exerted on the plant will progressively increase as the striker bars are translated forwardly relative to the plant.

In summary, the non-steady state shaking action induced by the striker bars of the continuous harvester of the present invention is expected to dislodge a greater percentage of the grapes from grapevines without causing any significant plant or fruit support structure damage. In the embodiments where the front ends of the striker bars are shaken less vigorously than the rear ends thereof, it is expected that less juice loss will occur since the easier-to-remove grapes will be dislodged first without the use of excessive force. Also, since the front and rear shaker frames of the harvester pivot independently of each other and are mechanically isolated except through a non-rigid connection at the striker bars, in the event that a relatively still object is struck by the striker bars, no power or force is transferred between the separate shaker frames. As a result of such isolation of the shaker frames from each other, it is expected that the harvester of the present invention will be subject to minimal reliability and maintenance problems.

Although the best modes contemplated for carrying out the present invention have been herein shown and described, it will be apparent that various modifications or changes may be made without departing from what is regarded to be the subject matter of the present invention.

What is claimed is:

1. A method of harvesting plants that are grown in rows, such as grapevines, the method comprising the steps of: positioning a pair of elongate striker elements on opposite sides of a plant in a row of plants; translating the elongate striker elements forwardly relative to the plants in the row from one end of the row to the other end thereof, concurrently with such translating, swinging the leading ends of the striker elements back and forth about an axis that is parallel to the row; and concurrently with the translating of the elongate striker elements, swinging the rear ends of the striker elements about an axis that is parallel to the row and at a rate relative to the swinging of the front ends of the elements so that the rear ends impart a different shaking action to a plant therebetween than the shaking action simultaneously imparted by the front ends of the striker elements.

2. The method of claim 1 wherein the rear ends of the striker elements are swung through an arcuate path having an amplitude that is different from the amplitude of the arcuate path of movement of the front ends of the striker elements.

3. The method according to claim 1 wherein the rear ends of the elongate striker elements are swung back and forth at a different frequency than the swinging of the front ends of the striker elements.

4. The method according to claim 1 wherein the rear ends of the striker elements are swung back and forth in an out-of-phase relationship with the swinging of the front ends of the striker elements.

* * * * *